United States Patent Office 3,544,570
Patented Dec. 1, 1970

3,544,570
1,2,4-TRIAZINE-5-ONES
Helmut Timmler, Wuppertal-Vohwinkel, Richard Wegler, Leverkusen, Ludwig Eue, Cologne-Stammheim, and Helmuth Hack, Cologne-Buchheim, Germany, assignors to Farbenfabriken Bayer Aktiengesellschaft, Leverkusen, Germany, a corporation of Germany
No Drawing. Filed Aug. 8, 1968, Ser. No. 751,069
Claims priority, application Germany, Aug. 18, 1967, F 53,277
Int. Cl. C07d 55/10
U.S. Cl. 260—248　　　　　　　　　　　　10 Claims

ABSTRACT OF THE DISCLOSURE 3-(alkylmercapto, alkoxy, alkenylmercapto, alkenyloxy, chloroalkenylmercapto, chloroalkenyloxy, phenyl-alkylmercapto, phenylalkoxy, chloro- and nitro- -phenyl-alkylmercapto, chloro- and nitro- -phenyl-alkoxy, amino, alkylamino, dialkylamino, and heterocyclic, e.g. pyrrolodino, morpholino, piperidino, etc.)-4-(alkyl, alkenyl and phenyl)-6-(alkyl, cycloalkyl, phenyl-alkyl, chlorophenyl-alkyl, carbo-alkoxy, alkoxycarbonyl - alkyl, phenyl, chloronitro-, alkyl- and alkoxy- -phenyl, and heterocyclic, e.g. furyl, pyrrolidyl, morpholyl, pyridyl, piperidyl, etc.)-1,2,4-triazine-5-ones, which possess herbicidal properties, and which may be produced by conventional methods.

The present invention relates to and has for its objects the provisions for new 3,4,6-substituted-1,2,4-asymmetric triazine-5-ones which possess valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is known that symmetric 1,3,5-triazines can be used for the control of weeds (cf. Belgian Patent 540,590). From this group of active compounds, 2,6-di-(ethylamino)-4-chloro-1,3,5-triazine (A) has attained a considerable practical significance.

It has now been found, in accordance with the present invention, that the new 1,2,4-triazine-5-ones having the general formula

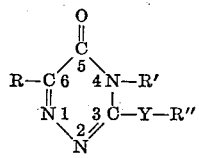

(I)

in which
R is selected from the group consisting of alkyl having 1–6 carbon atoms, cycloalkyl having 5–8 carbon atoms, phenyl-lower alkyl, chlorophenyl-lower alkyl, carbo- lower alkoxy, lower alkoxy carbonyl-lower alkyl, phenyl, substituted phenyl which is substituted with 1–2 substituents selected from the group consisting of chloro, nitro, alkyl having 1–4 carbon atoms and alkoxy having 1–4 carbon atoms, and heterocyclic having 5–6 ring members including as hetero atom a member selected from the group consisting of oxygen, nitrogen, and both said oxygen and nitrogen;
R' is selected from the group consisting of alkyl having 1–6 carbon atoms, alkenyl having 2–6 carbon atoms, and phenyl; and
Y is selected from the group consisting of —SR", —OR" and

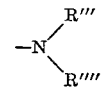

in which
R" is selected from the group consisting of alkyl having 1–6 carbon atoms, alkenyl having 2–4 carbon atoms, chloro-substituted alkenyl having 2–4 carbon atoms, phenyl-lower alkyl, and substituted phenyl-lower alkyl which is substituted with a substituent selected from the group consisting of chloro and nitro; and
R'" and R"" each individually is selected from the group consisting of hydrogen and alkyl having 1–6 carbon atoms;
With the proviso that R'" and R"" when taken together with the adjacent N-atom form a heterocyclic ring having 5–6 members including as hetero atom a member selected from the group consisting of nitrogen and both said nitrogen and oxygen, exhibit strong herbicidal, in particular selective herbicidal, properties.

It is surprising that the instant asymmetric triazinones exhibit a stronger herbicidal activity and a higher selectivity than the previously known symmetric 1,3,5-triazines.

In the following, information is given about the preparation of the asymmetric triazinones of Formula I above according to the present invention.

The instant asymmetric triazinones can be prepared according to different previously known processes. Preferably, however, a start is made from 2,3,4,5-tetrahydro-1,2,4-triazine-5-one-3-thiones (many of which are known) having the generic Formula II in which R and R' are the same as defined above, as follows:

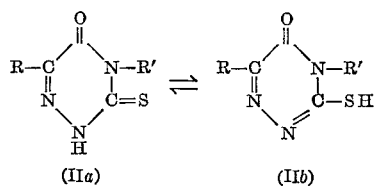

These substances are tautomeric. In general, they are present in the solid state according to the first of these structures (IIa) but often react according to the second (IIb), both being contemplated under the generic designation Formula II.

The preparation of these starting materials may take place according to previously known processes by reaction of the appropriate α-ketonic acids with the appropriate 4-substituted thiosemicarbazides (see Fortschritte der chemischen Forschung, volume 5, pp. 189–1965).

From these starting triazinonethiones of Formula II, the instant asymmetric triazinones of Formula I are, in principle, obtained according to three different methods, depending on which meaning Y has in the given formula: (a) Preparation of triazinones having the Formula I in which Y is —S—R″:

These triazinones are prepared by reaction of the triazinonethiones with alkylating agents, particularly an alkyl halide, preferably in the presence of alkali metal alcoholates, excess alcohol being used as solvent. The reaction is preferably carried out at temperatures between about 20 to 100° C.

As alkylating agent, alkyl halides are used, in particular the chlorides, bromides or iodides, whereby an alkylation on the nitrogen is avoided. The reaction proceeds according to the following typical reaction scheme in which R, R′ and R″ are the same as defined above:

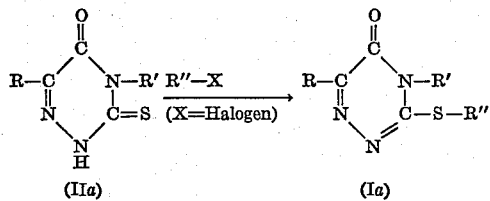

(IIa)    (Ia)

(b) Preparation of triazinones having the Formula I in which Y is —O—R″:

For the preparation of these triazinones, the above-mentioned mercapto compounds according to Formula Ia are used as starting materials, in particular the methylmercapto compounds.

The particular new compounds having the Formula Ib are obtained when the compounds having the Formula Ia are reacted with alcoholates, preferably in the presence of alkyl halides. An excess of alcohol can be used as solvent. The temperatures used are, in general, between about 20 to 100° C.

(c) Preparation of triazinones having the Formula I in which Y is

These compounds are obtained by reaction of the compounds of the Formula Ia with amines, the reaction preferably being carried out in the presence of inert solvents or with an excess of the amines. The temperatures used are usually between about 60 to 150° C.

The two individual reactions under (b) and (c) proceed correspondingly according to the following over-all formula scheme in which R, R′, R″, R‴ and R⁗ are the same as defined above

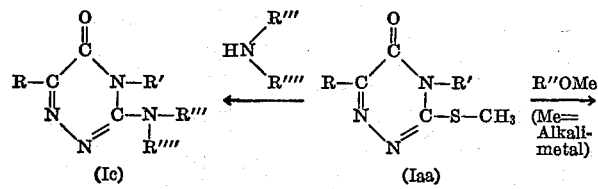

(Ic)    (Iaa)

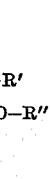

(Ib)

Advantageously, in accordance with the present invention, in the various formulae herein:

R represents:

Alkyl having 1–6 carbon atoms, including straight and branched chain $C_{1-6}$ alkyl, especially lower alkyl, such as methyl, ethyl, n- and iso- propyl, n-, iso-, sec.- and tert.-butyl, amyl, isoamyl, hexyl, isohexyl, and the like, and particularly $C_{1-4}$ or $C_{1-3}$ alkyl;

Cycloalkyl having 5–8 carbon atoms, such as cyclopentyl, cyclohexyl, cycloheptyl, cyclooctyl, and the like, especially $C_{5-6}$ cycloalkyl, and particularly cyclohexyl;

Phenyl lower alkyl such as phenyl- methyl to tert.- butyl inclusive, as defined above, and the like, especially phenyl $C_{1-4}$ alkyl, and particularly benzyl;

Chlorophenyl lower alkyl such as chloro-substituted phenyl- methyl to tert.-butyl inclusive, as defined above, and the like, especially monochloro, e.g. p-chloro, phenyl $C_{1-4}$ alkyl, and particularly monochloro-benzyl;

Carbo-lower alkoxy (i.e. lower alkoxy carbonyl) such as carbomethoxy, carboethoxy, carbo- -n- and -iso--propoxy, carbo -n-, -iso-, -sec.- and -tert.-butoxy, and the like, especially carbo-$C_{1-4}$ alkoxy (i.e. $C_{1-4}$ alkoxy-carbonyl);

Lower alkoxy carbonyl-lower alkyl (i.e. lower alkanoic acid lower alkyl ester) such as methoxy, ethoxy, n- and iso- propoxy, n-, iso-, sec.- and tect.-butoxy -carbonyl-substituted methyl to tert.-butyl inclusive, as defined above, and the like, especially $C_{1-4}$ alkoxy-carbonyl-$C_{1-4}$ alkyl (i.e. $C_{2-5}$ alkanoic acid $C_{1-4}$ alkyl ester);

Phenyl;

Substituted phenyl which is substituted with 1–2 substituents such as chloro, nitro, $C_{1-4}$ alkyl such as methyl to tert.-butyl inclusive, as defined above, and $C_{1-4}$ alkoxy such as methoxy to tert.-butoxy inclusive, as defined above; or Heterocyclic having 5–6 ring members including oxygen and/or nitrogen as hetero atoms, such as furyl, pyrrolidyl, morpholyl, pyridyl, piperidyl, and the like, especially furyl, morpholino, piperidino, and particularly furyl;

R′ represents:

Alkyl having 1–6 carbon atoms as defined above for R, and particularly $C_{1-4}$ or $C_{1-3}$ alkyl;

Alkenyl having 2–6 carbon atoms, including straight and branched chain $C_{2-6}$ alkenyl, especially lower alkenyl such as vinyl, α-allyl (i.e. prop-2-enyl), β-allyl (i.e. 1-methyl vinyl), γ-allyl (i.e. prop-1-enyl), but-1-enyl, but-2-enyl (i.e. crotyl), but-3-enyl, methallyl (i.e. 2-methyl-prop-2-enyl), isobutenyl (i.e. 2-methyl-prop-1-enyl), pentenyl, hexenyl, and the like, and particularly $C_{2-4}$ alkenyl; or phenyl; and Y represents: —SR″, —OR″, or

in which R″ represents:

Alkyl having 1–6 carbon atoms as defined above for R, and particularly $C_{1-4}$ or $C_{1-3}$ alkyl;

Alkenyl having 2–4 carbon atoms as defined above for R′, such as vinyl to isobutenyl inclusive;

Chloro-substituted alkenyl having 2–4 carbon atoms as defined immediately above, such as chloro-substituted vinyl to isobutenyl inclusive, and the like, especially mono and dichloro substituted $C_{2-4}$ alkenyl, and particularly 2,3-dichloro-prop-2-enyl;

Phenyl lower alkyl as defined above for R, especially phenyl $C_{1-4}$ alkyl, and particularly benzyl; or Substituted phenyl lower alkyl as defined immediately above, which is substituted with chloro or nitro, especially chloro- and nitro-phenyl $C_{1-4}$ alkyl, and particularly chloro-(e.g. p-chloro)benzyl and nitro-(e.g. p-nitro) benzyl; and R‴ and R⁗ each individually represents hydrogen; or Alkyl having 1–6 carbon atoms as defined above for R, and particularly $C_{1-4}$ or $C_{1-3}$ alkyl;

With the proviso that R''' and R'''' when taken together with the adjacent N-atom form a heterocyclic ring having 5–6 ring members including nitrogen or nitrogen and oxygen as hetero atoms, such as pyrrolidino, morpholino, piperidino, and the like, especially morpholino and piperidino.

Preferably, R is $C_{5-6}$ cycloalkyl, phenyl, chlorophenyl and $C_{1-4}$ alkyl phenyl, R' is $C_{1-4}$ alkyl, and Y is —SR'' in which R'' is $C_{1-4}$ alkyl, $C_{2-4}$ alkenyl, chloro $C_{2-4}$ alkenyl, especially dichloro-$C_{2-4}$ alkenyl, chlorophenyl-$C_{1-4}$ alkyl or nitrophenyl-$C_{1-4}$ alkyl; or Y is —OR'' in which R'' is $C_{1-4}$ alkyl; or Y is

in which R''' and R'''' each individually is hydrogen or $C_{1-4}$ alkyl, with the proviso that R''' and R'''' when taken together with the adjacent N-atom form a heterocyclic moiety such as morpholino or piperidino.

In accordance with a particular feature of the present invention, R is $C_{5-6}$ cycloalkyl, phenyl, chlorophenyl and $C_{1-4}$ alkyl phenyl, R' is $C_{1-4}$ alkyl, and Y is $C_{1-4}$ alkylmercapto, $C_{2-4}$ alkenylmercapto, chloro-substituted $C_{2-4}$ alkenylmercapto, especially dichloro $C_{2-4}$ alkenylmercapto, $C_{1-4}$ alkoxy, amino, mono-$C_{1-4}$ alkylamino, di-($C_{1-4}$ alkyl)amino, morpholino and piperidino, Y preferably being $C_{1-4}$ alkylmercapto, $C_{2-4}$ alkenylmercapto, chloro-substituted $C_{2-4}$ alkenylmercapto, especially dichloro-$C_{2-4}$ alkenylmercapto, and $C_{1-4}$ alkoxy.

Advantageously, the active compounds according to the present invention influence plant growth and can, therefore, be used to combat weeds, for example as defoliants, desiccants or weed killers. By weeds is meant in the widest sense all plants which grow in places where they are not desired. Whether the active compounds according to the invention act as total or selective herbicides depends essentially on the amount applied, as the artisan will appreciate.

The active compounds according to the present invention can be used, for example, in the case of the following typical plants: dicotyledons, such as mustard (Sinapis), cress (Lepidium), cleaver (Galium), common chickweed (Stellaria), mayweed (Matricaria), smallflower Galinsoga (Galinsoga), fathen (Chenopodium), stinging nettle (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum); and the like.

The active compounds according to the present invention can, when a small amount is applied, be used very well as selective herbicides, quite particularly in cereals, such as wheat, and in potatoes.

The particular active compounds to be used according to the instant invention can be utilized, if desired, in the form of the usual formulations or compositions with diluents or extenders, i.e. dispersible carrier vehicles, such as solutions, emulsions, suspensions, emulsifiable concentrates, spray powders, pastes, soluble powders, dusting agents, granules, etc. These are prepared in known manner, for instance by extending the active compounds with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents. The following may be chiefly considered for use as carrier vehicles for this purpose: dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), ethers, ether-alcohols (e.g. glycol monomethyl ether, etc.), amines (e.g. ethanolamine, etc.), amides (e.g. dimethyl formamide, etc.), sulfoxides (e.g. dimethyl sulfoxide, etc.), ketones (e.g. acetone, etc.), and/or water; as well as dispersible finely divided solid carriers, such as ground natural minerals (e.g. kaolins, alumina, silica, chalk, i.e. calcium carbonate, talc, kieselguhr, etc.), and ground synthetic minerals (e.g. highly dispersed silicic acid, silicates, e.g. alkali silicates, etc.); whereas the following may be chiefly considered for use as carrier vehicle assistants, e.g. surface-active agents, for this purpose: emulsifying agents, such as nonionic and/or anonic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.01 and 10%, preferably 0.1–1%, by weight of the mixture. Thus, the present invention contemplates over-all compositions which comprise mixtures of a dispersible carrier vehicle such as (1) a dispersible carrier solid, and/or (2) a dispersible carrier liquid such as an inert organic solvent and/or water, preferably including an effective amount of a carrier vehicle assistant, e.g. a surface-active agent, such as an emulsifying agent and/or a dispersing agent, and an amount of the active compound which is effective for the purpose in question and which is generally between about 0.01 and 95% by weight of the mixture.

While the active compounds can be used according to the pre-emergence method, they are also effective when used according to the post-emergence method, i.e. after emergence of the weeds and useful plants.

If the active compounds are used after the emergence of the plants, they are applied, e.g. in the form of carrier vehicle compositions having an active compound concentration of, in general, substantially between about 0.05–10%, preferably between about 0.1–1%, by weight of the mixture.

When the active compounds are used as total herbicides, the amount of active compound actually applied, whether alone or in the form of a composition with a carrier vehicle, is, in general, substantially between about 5–20 kg./hectare, and preferably between about 10–20 kg./hectare. On the other hand, when the active compound is used as selective herbicide, the amount of the active compound actually applied, whether alone or in composition form, is, in general, substantially between about 0.5–5 kg./hectare. Thus, over-all amounts of substantially between about 0.5–20 kg./hectare generally may be used.

The active compound can also be used in accordance with the well-known ultra-low volume process with good success, i.e. by applying such compound if normally a liquid, or by applying a liquid composition containing the same, via very effective atomizing equipment in extremely finely divided form, i.e. mist form, for example by airplane crop spraying techniques. Only a few liters/hectare are needed, and often amounts up to about 1 quart/acre, preferably 2–16 fluid ounces/acre, are sufficient. In this process it is possible to use highly concentrated liquid compositions with said liquid carrier vehicles containing from about 40 to about 95% by weight of active compound or even the 100% active substance alone, e.g. about 40–100% by weight of the active compound.

Furthermore, the present invention contemplates methods of selectively controlling or combating, i.e. killing, defoliating and/or desiccating, undesired plants, e.g. weeds and the like, which comprise applying to at least one of (a) such weeds and (b) their habitat, i.e. the locus to be protected, a herbicidally effective amount (or defoliant or desiccant effective amount, as the case may be) of the particular active compound of the invention alone or together with a carrier vehicle as noted above. The instant formulations or compositions are applied in the usual manner, for example, by spraying, atomizing, scattering, dusting, watering, sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application and may be varied within a fairly wide range depending upon the weather conditions, the purpose for which the active compound is used, and the plants which are to be controlled or protected. Therefore, in special cases, it is possible to go above or below the aforementioned concentration ranges.

The following examples illustrate, without limitation, the herbicidal activity of the particular active compounds of the present invention.

EXAMPLE 1

Pre-emergence test

Solvent: 5 parts by weight acetone
Emulsifier: 1 part by weight alkylaryl polyglycol ether.

To produce a suitable preparation of the particular active compound, 1 part by weight of such active compound is mixed with the stated amount of solvent, the stated amount of emulsifier is then added and the resulting concentrate is diluted with water to the desired final concentration.

Seeds of the test plants are sown in normal sail and, after 24 hours, watered with the preparation of the given active compound. It is expedient to keep constant the amount of water per unit area. The concentration of the active compound in the preparation is of no importance, only the amount of active compound applied per unit area being decisive. After three weeks, the degree of damage to the test plants is determined and characterized by the values 0–5, which have the following meaning:

0—no effect
1—slight damage or delay in growth
2—marked damage or inhibition of growth
3—heavy damage and only deficient development or only 50% emerged
4—plants partially destroyed after germination or only 25% emerged
5—plants completely dead or not emerged.

The active compounds tested, the amounts applied and the results obtained can be seen from the following Table 1:

TABLE I.—PRE-EMERGENCE TEST

| Active compound | Amount applied of active compound in kg./hectare | Echinochloa | Chenopodium | Sinapis | Wheat |
|---|---|---|---|---|---|
| (A) (Known) Cl-triazine with $H_5C_2$-NH and $C_2H_5$-NH substituents | 5 | 3-4 | 4-5 | 5 | 4 |
|  | 2.5 | 3 | 4-5 | 5 | 4 |
|  | 1.25 | 2 | 4-5 | 5 | 3 |
| (1₁) Phenyl-C(=O)-N(CH₃)-C(=N)-S-CH₃ | 5 | 5 | 5 | 5 | 5 |
|  | 2.5 | 5 | 5 | 5 | 5 |
|  | 1.25 | 5 | 5 | 5 | 4 |
| (2₁) Phenyl-C(=O)-N(C₂H₅)-C(=N)-S-CH₃ | 5 | 5 | 5 | 5 | 2 |
|  | 2.5 | 5 | 5 | 5 | 0 |
|  | 1.25 | 4 | 5 | 5 | 0 |

EXAMPLE 2

The following Table 2 shows the results of a further test carried out in a similar manner to that of Example 1:

TABLE 2.—PRE-EMERGENCE TEST

| Active compound | Amount applied of active compound in kg./hectare | Echino-chloa | Cheno-podium | Sina-pis | Wheat |
|---|---|---|---|---|---|
| ($3_1$) Phenyl-C(=O)-N(CH$_3$)-C(=N-N)-S-CH$_2$-CH=CH$_2$ | 2.5 | 5 | 5 | 5 | 5 |
|  | 1.25 | 4 | 5 | 4 | 3 |
| ($4_1$) Phenyl-C(=O)-N(CH$_3$)-C(=N-N)-O-CH$_3$ | 2.5 | 5 | 5 | 5 | 4-5 |
|  | 1.25 | 5 | 5 | 5 | 4 |

EXAMPLE 3

Post-emergence test

Solvent: 5 parts by weight acetone
Emulsifier: 1 part by weight alkylaryl polyglycol ether.

To produce a suitable preparation of the particular active compound, 1 part by weight of such active compound is mixed with the stated amount of solvent, the stated amount of emulsifier is then added and the resulting concentrate is diluted with water to the desired final concentration.

Test plants which have a height of about 5–15 cm. are sprayed with the preparation of the given active compound until just dew moist. After three weeks, the degree of damage to the plants is determined and characterized by the values 0–5, which have the following meaning:

0—no effect
1—a few slightly burnt spots
2—marked damage to leaves
3—some leaves and parts of stalks partially dead
4—plant partially destroyed
5—plant completely dead.

The active compounds tested, their concentrations and the results obtained can be seen from the following Table 3:

TABLE 3.—POST-EMERGENCE TEST

| Active Compound | Concentration of active compound in percent | Echino-chloa | Cheno-podium | Sina-pis | Galin-soga | Stel-laria | Urti-ca | Matri-caria | Dau-cus | Oats | Wheat |
|---|---|---|---|---|---|---|---|---|---|---|---|
| (A) Cl-triazine with N-C$_2$H$_5$ and N-C$_2$H$_5$ (known) | 0.1 | 4 | 5 | 5 | 4-5 | 5 | 5 | 5 | 3 | 5 | 4 |
|  | 0.05 | 3 | 5 | 5 | 4 | 5 | 5 | 3 | 1 | 4 | 2 |
|  | 0.025 | 2 | 4 | 5 | 2 | 5 | 4 | 2 | 0 | 2 | 1 |
|  | 0.01 | 1 | 3 | 4 | 1 | 4 | 3 | 0 | 0 | 0 | 0 |
| ($1_2$) Phenyl-C(=O)-N(CH$_3$)-C(=N-N)-S-CH$_3$ | 0.1 | 5 | 5 | 5 | 5 | 5 | 5 | 5 | 5 | 4 | 1 |
|  | 0.05 | 5 | 5 | 5 | 5 | 5 | 5 | 4-5 | 5 | 2 | 0 |
|  | 0.025 | 5 | 5 | 5 | 5 | 5 | 5 | 4 | 5 | 1 | 0 |
|  | 0.01 | 4-5 | 4 | 5 | 4 | 5 | 5 | 2 | 4 | 0 | 0 |
| ($5_1$) Cyclohexyl-C(=O)-N(CH$_3$)-C(=N-N)-S-CH$_3$ | 0.1 | 5 | 5 | 5 | 5 | 5 | 5 | 5 | 1 | 4-5 | 1 |
|  | 0.05 | 4 | 5 | 5 | 5 | 5 | 5 | 5 | 0 | 3-4 | 0 |
|  | 0.025 | 3-4 | 4 | 5 | 4 | 5 | 5 | 4 | 0 | 3 | 0 |
|  | 0.01 | 2 | 2 | 5 | 2 | 4 | 5 | 2 | 0 | 1 | 0 |

EXAMPLE 4

The following Table 4 shows the results of a further test carried out in a similar manner to that of Example 3:

TABLE 4.—POST-EMERGENCE TEST

| Active Compound | Concentration of active compound in percent | Echinochloa | Chenopodium | Sinapis | Galinsoga | Stellaria | Urtica | Matricaria | Daucus | Oats | Wheat |
|---|---|---|---|---|---|---|---|---|---|---|---|
| ($3_2$) [structure: phenyl-triazinone with N–CH$_3$ and C–S–CH$_2$–CH=CH$_2$] | 0.025 | 4–5 | 5 | 5 | 5 | 5 | 5 | 4–5 | 3 | 2 | 0 |
| | 0.01 | 4 | 5 | 5 | 5 | 5 | 5 | 4 | 2 | 1 | 0 |
| ($4_2$) [structure: phenyl-triazinone with N–CH$_3$ and C–O–CH$_3$] | 0.025 | 5 | 5 | 5 | 5 | 5 | 5 | 5 | 5 | 1–2 | 4–5 |
| | 0.01 | 4–5 | 5 | 5 | 5 | 5 | 5 | 5 | 5 | 0 | 3 |
| ($6_1$) [structure: methylphenyl-triazinone with N–CH$_3$ and C–S–CH$_3$] | 0.025 | 4 | 5 | 5 | 5 | 5 | 5 | 4–5 | 5 | 43 | 2 |
| | 0.01 | 4 | 4–5 | 5 | 4 | 3–4 | 5 | 4 | 4 | | 0 |

EXAMPLE 5

The preparation of the particular active compound is produced as described in Example 1.

This preparation of the given active compound contains the active compound in a concentration of 0.05 percent by weight. Dwarf beans are sprayed with this preparation of active compound until dripping wet. After 8 days, the leaves are completely destroyed, whereby the harvesting of the beans is considerably facilitated.

As active compounds, the triazinones stated in the following Table 5 are used, the first triazinone of which is particularly effective.

TABLE 5

| R | R' | R" (where Y=—SR") |
|---|---|---|
| ($1_3$) C$_6$H$_5$— | CH$_3$— | CH$_3$— |
| ($7_1$) C$_6$H$_5$— | CH$_3$— | CHCl=CCl—CH$_2$— |
| ($2_2$) C$_6$H$_5$— | C$_2$H$_5$— | CH$_3$— |
| ($8_1$) p–Cl–C$_6$H$_4$— | CH$_3$— | CH$_3$— |
| ($5_2$) cyclo-C$_6$H$_{11}$— | CH$_3$— | CH$_3$— |

The following further examples illustrate, without limitation, methods of preparation of compounds according to the present invention:

EXAMPLE 6

Preparation of 3-mercapto-1,2,4-triazine-5-ones with different substituents in 3-, 4- and 6-position according to Formula I in which Y is —S—R":

219 g. 4-methyl - 6 - phenyl-2,3,4,5-tetrahydro-1,2,4-triazine-5-one-3-thione are mixed with a solution of 23 g. sodium in 200 ml. ethanol. 150 g. methyl iodide are added dropwise, with stirring, and, finally, heating overnight at 60° C. (bath temperature) is carried out. After cooling, suction filtration is effected and the mother liquor is evaporated. The residue on the filter and the residue after evaporation are then digested with water. After recrystallization of the residue from a little methanol, there are obtained 190 g. (81% of the theory) of 3-methylmercapto-4-methyl-6-phenyl-1,2,4-triazine - 5 - one ($1_4$)—see Table 6 below.

In analogous manner there are obtained the triazinones of Formula I in which Y is —S—R" mentioned in the following Table 6.

TABLE 6

| | R | R' | R" | M.P., °C. |
|---|---|---|---|---|
| ($1_4$) | C$_6$H$_5$ | CH$_3$ | CH$_3$ | 99–100 |
| ($8_2$) | p–Cl–C$_6$H$_4$— | CH$_3$ | CH$_3$ | 143 |
| ($9_1$) | CH$_3$ | CH$_3$ | CH$_3$ | 70 |
| ($5_3$) | cyclo–C$_6$H$_{11}$— | CH$_3$ | CH$_3$ | 115 |
| ($10_1$) | (CH$_3$)$_2$CH— | CH$_3$ | CH$_3$ | 90 |
| ($11_1$) | —COOC$_2$H$_5$ | CH$_3$ | CH$_3$ | 159 |
| ($12_1$) | CH$_3$OOC—CH$_2$—CH$_2$— | CH$_3$ | CH$_3$ | 111 |
| ($2_3$) | C$_6$H$_5$ | C$_2$H$_5$ | CH$_3$ | 79 |
| ($13_1$) | C$_6$H$_5$ | CH$_2$=CH—CH$_2$— | CH$_3$ | 97 |
| ($7_2$) | C$_6$H$_5$ | CH$_3$ | CHCl=CCl—CH$_2$— | 109 |
| ($14_1$) | C$_6$H$_5$ | CH$_3$ | Cl–C$_6$H$_4$–CH$_2$— | 135 |

TABLE 6—Continued

| | R | R' | R" | M.P. °C. |
|---|---|---|---|---|
| (15₁) | C₆H₅ | CH₃ | O₂N—⟨⟩—CH₂— | 150 |
| (16₁) | CH₃ | C₆H₅ | CH₃ | 150 |
| (17₁) | CH₃ | C₆H₅ | CH₂=CH—CH₂— | 128 |
| (18₁) | CH₃ | C₆H₅ | O₂N—⟨⟩—CH₂— | 178 |
| (19₁) | CH₃ | C₆H₅ | Cl—⟨⟩—CH₂— | 169 |
| (20₁) | C₆H₅ | C₆H₅ | O₂N—⟨⟩—CH₂— | 169 |
| (21₁) | C₆H₅ | C₆H₅ | Cl—⟨⟩—CH₂— | 185 |
| (22₁) | C₆H₅ | C₆H₅ | CH₃ | 161 |
| (23₁) | C₆H₅ | C₆H₅ | CH₂=CH—CH₂— | 153 |
| (24₁) | C₆H₅—CH₂— | CH₃ | CH₃ | 99 |
| (25₁) | C₆H₅ | CH₃ | C₂H₅ | 71 |
| (26₁) | C₆H₅ | CH₃ | —CH(CH₃)₂ | 121 |
| (27₁) | —CH₂—⟨⟩—Cl | CH₃ | CH₃ | 142 |
| (28₁) | C₆H₅ | —CH₂—CH(CH₃)₂ | CH₃ | 65 |
| (29₁) | m—CH₃O—C₆H₄ | CH₃ | CH₃ | 123 |
| (6₂) | m—CH₃—C₆H₄ | CH₃ | CH₃ | 88 |
| (30₁) |  | CH₃ | CH₃ | 155 |

EXAMPLE 7

The following compounds according to Formula I in which Y is —S—R" are obtained by a method similar to that of Example 6:

TABLE 7

| | R | R' | R" | M.P. °C. |
|---|---|---|---|---|
| (31₁) |  | CH₃— | CH₂=CH—CH₂— | 133 |
| (32₁) | p-NO₂—C₆H₄— | CH₃— | CH₃— | 139 |
| (33₁) | m-Cl—C₆H₄— | CH₃— | CH₃— | 142 |

EXAMPLE 8

Preparation of 3-oxy-1,2,4-triazine-5-ones with different substituents in 3-, 4- and 6-position according to Formula I in which Y is —O—R":

23.3 g. 3-methylmercapto-4-methyl-6-phenyl-1,2,4-triazine-5-one (1₅) are mixed with a solution of 2.3 g. sodium in 200 ml. methanol. After the dropwise addition of 14.6 g. methyl iodide, the mixture is boiled overnight. After evaporating off the methanol, the residue is digested with water and recrystallized from aqueous methanol. There are obtained 16.5 g. (76% of the theory) of 3-methoxy-4-methyl-6-phenyl-1,2,4-triazine-5-one (4₃) — see Table 8 below.

In analogous manner there is prepared the triazinone of Formula I in which Y is —O—R" mentioned in the following Table 8:

TABLE 8

| | R | R' | R" | M.P. °C |
|---|---|---|---|---|
| (4₃) | C₆H₅— | CH₃— | CH₃— | 101 |
| (34₁) | m-CH₃O—C₆H₄— | CH₃— | CH₃— | 103 |

EXAMPLE 9

The following compounds according to Formula I in which Y is —O—R" are obtained by a method similar to that of Example 8:

TABLE 9

| | R | R' | R" | M.P. °C. |
|---|---|---|---|---|
| (35₁) |  | CH₃— | C₂H₅— | 112 |
| (36₁) | (CH₃)₂CH— | CH₃— | CH₃— | 98 |

EXAMPLE 10

Preparation of 3-amino-1,2,4-triazine-5-ones with different substituents in 3-, 4- and 6-position according to Formula I in which Y is $$-\underset{\underset{R''''}{|}}{N}-R'''$$

23.3 g. 3-methylmercapto-4-methyl-6-phenyl-1,2,4-triazine-5-one (1₆) are heated to 120° C. for 4 hours with 110 ml. morpholine, methylmercaptan being split off. The mixture is then poured into 1000 ml. of water and the reaction product is filtered off with suction. After recrystallization from methanol there are obtained 15 g. 3-(N-morpholino) - 4 - methyl-6-phenyl-1,2,4-triaziline-5-one (37₁)—see Table 10.

In analogous manner, other triazinones of Formula I in which Y is $$-N-R'''$$
$$\phantom{-N-}|$$
$$\phantom{-N-}R''''$$

are prepared as mentioned in the following Table 10:

TABLE 10

| | R | R' | R'' | M.P. °C. |
|---|---|---|---|---|
| (37₁) | C₆H₅— | CH₃— |  | 130 |
| (38₁) | C₂H₅— | CH₃— |  | 132 |
| (39₁) | C₆H₅— | CH₃— | n—C₄H₉\N—/n—C₄H₉ | 145 |

EXAMPLE 11

8.9 g. benzoylformic acid ethyl ester are mixed with 11.5 g. N-methyl-N'-methyl-N''-amino-guanidine hydroiodide of the formula:

$$\text{NHCH}_3$$
$$(H_2N-N=\overset{|}{C}-NHCH_3.HI) \qquad (IId)$$

and 32 ml. of water. After the addition of 10 drops of concentrated hydrochloric acid, heating to 70° C. (bath temperature) is effected for 4 hours. This is followed by evaporation, dissolving of the residue in water and precipitation of the base with ammonia. There are obtained 12 g. 3-methylamino-4-methyl-6-phenyl-1,2,4-triazine-5-one (40₁)—see Table 11.

In analogous manner there is prepared the triazinone of Formula I in which Y is $$-N-R'''$$
$$\phantom{-N-}|$$
$$\phantom{-N-}R''''$$

mentioned in the following Table 11:

TABLE 11

| | R | R' | R''' | R'''' | M.P. °C. |
|---|---|---|---|---|---|
| (40₁) | C₆H₅— | CH₃— | CH₃— | H— | 249 |
| (41₁) | C₆H₅— | CH₃— | H— | H— | 270⁶ |

EXAMPLE 12

The following compounds according to Formula I in which Y is —N—R'' are obtained by a method similar to that of Example 11:

TABLE 12

| | R | R' | R''' | R'''' | M.P. °C. |
|---|---|---|---|---|---|
| (42₁) | C₆H₅— | CH₃— | CH₃— | CH₃— | 198 |
| (43₁) | (CH₃)₂CH— | CH₃— | CH₃— | H | 217 |

In the following, the preparation of appropriate starting thiones used for the preparation of the triazinones according to the invention is explained in more detail.

EXAMPLE 13

Preparation of the 2,3,4,5-tetrahydro-1,2,4-triazine-5-one-3-thiones of Formula II:

A solution of 150 g. benzoylformic acid in 1000 ml. of water is introduced, with stirring, into a mixture of 500 ml. of concentrated hydrochloric acid, 105 g. 4-methyl-thiosemicarbazide and 5000 ml. of water. After stirring for five hours, the precipitated thiosemicarbazone is filtered off with suction, M.P. 165° C. (decomp.), yield 225 g. The thiosemicarbazone thus obtained is dissolved without further purification in a mixture of 50 g. of caustic soda and 2000 ml. of water. Heating on a water-bath, with stirring, is then effected for 6 hours and the resulting cyclization product is precipitated by introducing carbon dioxide. After recrystallization from ethanol, 4-methyl-6-phenyl- 2,3,4,5-tetrahydro-1,2,4-triazine-5-one-3-thione (1a) in a yield of 75% (see Table 13) is obtained.

In analogous manner, there are obtained the tetrahydro-triazinone-thiones of Formula II stated in the following Table 13:

TABLE 13

| | R | R' | M.P. °C. |
|---|---|---|---|
| (1a) | C₆H₅— | CH₃ | |
| (8a) | p—Cl—C₆H₄— | CH₃ | 224 |
| (9a) | CH₃ | CH₃ | 186 |
| (5a) | cyclo—C₆H₁₁ | CH₃ | 189 |
| (10a) | (CH₃)₂CH— | CH₃ | 193 |
| (11a) | —COOC₂H₅ | CH₃ | 247 |
| (12a) | CH₃OOC—CH₂—CH₂— | CH₃ | 140 |
| (2a) | C₆H₅ | C₂H₅ | 204 |
| (13a) | C₆H₅ | —CH₂—CH=CH₂ | 189 |
| (16a) | CH₃ | C₆H₅ | 215 |
| (20a) | C₆H₅ | C₆H₅ | 278 |
| (27a) | —CH₂—⟨C₆H₄⟩—Cl | CH₃ | 229 |
| (12aa) | HOOC—CH₂—CH₂— | CH₃ | 200 |
| (28a) | —C₆H₅ | —CH₂—CH(CH₃)₂ | 173 |
| (44a) | —C₆H₅ | —CH(CH₃)₂ | 175 |
| (45a) | CH₃ | —CH₂—CH(CH₃)₂ | 176 |
| (29a) | m—CH₃O—C₆H₄ | CH₃ | 164 |
| (24a) | C₆H₅—CH₂— | CH₃ | 182 |
| (6a) | m—CH₃—C₆H₄— | CH₃ | 195 |
| (30a) | 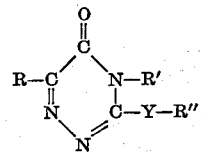 | CH₃ | 247 |

It will be realized by the artisan that all of the foregoing compounds contemplated by the present invention possess the desired selective or total herbicidal properties, and especially the capability of selectively destroying weeds, as well as a comparatively low toxicity toward warm-blooded creatures and a concomitantly low phytotoxicity with respect to higher plants, enabling such compounds to be used with correspondingly favorable compatibility with warm-blooded creatures and higher plants for more effective control and/or elimination of weeds by selective application of such compounds to such weeds and/or their habitat. Nevertheless, the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention which is to be limited only by the scope of the appended claims.

What is claimed is:
1. 1,2,4-triazine-5-one having the formula

$$\begin{array}{c} O \\ \| \\ C \\ R-C \diagup \diagdown N-R' \\ \| \phantom{xxxx} | \\ N \phantom{xxx} C-Y-R'' \\ \diagdown \phantom{x} \diagup \\ N \end{array}$$

in which R is selected from the group consisting of alkyl having 1–6 carbon atoms, cycloalkyl having 5–8 carbon atoms, phenyl-lower alkyl, chlorophenyl-lower alkyl, carbo-lower alkoxy, lower alkoxy carbonyl-lower alkyl, phenyl, substituted phenyl which is substituted with 1–2 substituents selected from the group consisting of chloro, nitro, alkyl having 1–4 carbon atoms and alkoxy having 1–4 carbon atoms, and heterocyclic selected from the group consisting of furyl, pyrrolidyl, morpholyl, pyridyl and piperidyl; R' is selected from the group consisting of alkyl having 1–6 carbon atoms, alkenyl having 2–6 carbon atoms, and phenyl; and Y is selected from the group consisting of —SR″, —OR″ and

in which R″ is selected from the group consisting of alkyl having 1–6 carbon atoms, alkenyl having 2–4 carbon atoms, chloro-substituted alkenyl having 2–4 carbon atoms, phenyl-lower alkyl, and substituted phenyl-lower alkyl which is substituted with a substituent selected from the group consisting of chloro and nitro; and R‴ and R″″ each individually is selected from the group consisting of hydrogen and alkyl having 1–6 carbon atoms; with the proviso that R‴ and R″″ when taken together with the adjacent N-atom form a heterocyclic ring selected from the group consisting of morpholino, piperidino and pyrrolidino.

2. Triazinone according to claim 1 wherein R is selected from the group consisting of $C_{1-4}$ alkyl, $C_{5-6}$ cycloalkyl, phenyl-$C_{1-4}$ alkyl, chlorophenyl-$C_{1-4}$ alkyl carbo-$C_{1-4}$ alkoxy, $C_{1-4}$ alkoxy-carbonyl-$C_{1-4}$ alkyl, phenyl, chloro-phenyl, nitrophenyl, $C_{1-4}$ alkyl-phenyl, $C_{1-4}$ alkoxy-phenyl, furyl, pyrrolidyl, morpholyl, pyridyl and piperidyl; R′ is selected from the group consisting of $C_{1-4}$ alkyl, $C_{2-4}$ alkenyl, and phenyl; and Y is selected from the group consisting of —SR″, —OR″ and

in which R″ is selected from the group consisting of $C_{1-4}$ alkyl, $C_{2-4}$ alkenyl, chloro-substituted $C_{2-4}$ alkenyl, phenyl-$C_{1-4}$ alkyl, chlorophenyl-$C_{1-4}$ alkyl, and nitrophenyl-$C_{1-4}$ alkyl, and R‴ and R″″ each individually is selected from the group consisting of hydrogen and $C_{1-4}$ alkyl, with the proviso that R‴ and R″″ when taken together with the adjacent N-atom form a heterocyclic ring selected from the group consisting of morpholino, piperidino and pyrrolidino.

3. Triazinone according to claim 1 wherein R is selected from the group consisting of $C_{5-6}$ cycloalkyl, phenyl, chlorophenyl and $C_{1-4}$ alkyl phenyl; R′ is $C_{1-4}$ alkyl; and Y is selected from the group consisting of —SR″ in which R″ is selected from the group consisting of $C_{1-4}$ alkyl, $C_{2-4}$ alkenyl, chloro-substituted $C_{2-4}$ alkenyl, chlorophenyl-$C_{1-4}$ alkyl and nitrophenyl-$C_{1-4}$ alkyl; —OR″ in which R″ is $C_{1-4}$ alkyl; and

in which R‴ and R″″ each individually is selected from the group consisting of hydrogen and $C_{1-4}$ alkyl, with the proviso that R‴ and R″″ when taken together with the adjacent N-atom form a heterocyclic ring selected from the group consisting of morpholino and piperidino.

4. Triazinone according to claim 1 wherein R is selected from the group consisting of $C_{5-6}$ cycloalkyl, phenyl, chlorophenyl and $C_{1-4}$ alkyl phenyl; R′ is $C_{1-4}$ alkyl; and Y is selected from the group consisting of $C_{1-4}$ alkylmercapto, $C_{2-4}$ alkenylmercapto, chloro-substituted $C_{2-4}$ alkenylmercapto, and $C_{1-4}$ alkoxy.

5. Triazinone according to claim 1 wherein such compound is 3 - methylmercapto - 4 - ethyl-6-phenyl-1,2,4-triazine-5-one having the formula

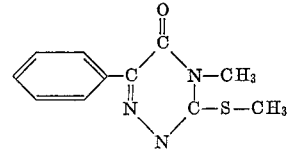

6. Triazinone according to claim 1 wherein such compound is 3 - methylmercapto - 4 - ethyl-6-phenyl-1,2,4-triazine-5-one having the formula

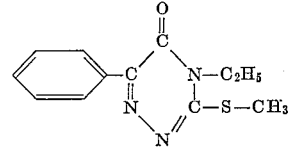

7. Triazinone according to claim 1 wherein such compound is 3 - ($\alpha$ - allyl) - mercapto-4-methyl-6-phenyl-1,2,4-triazine-5-one having the formula

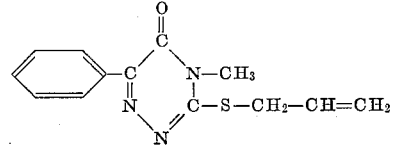

8. Triazinone according to claim 1 wherein such compound is 3 - methoxy - 4 - methyl-6-phenyl-1,2,4-triazine-5-one having the formula

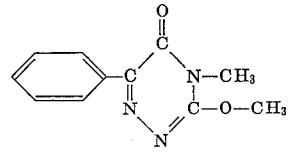

9. Triazinone according to claim 1 wherein such compound is 3 - methylmercapto - 4 - methyl-6-cyclohexyl-1,2,4-triazine-5-one having the formula

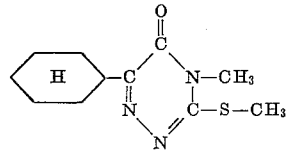

10. Triazinone according to claim 1 wherein such compound is 3 - methylmercapto - 4 - methyl-6-(m-methylphenyl)-1,2,4-triazine-5-one having the formula

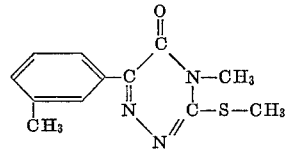

References Cited

UNITED STATES PATENTS 3,135,737    6/1964    Restivo _____ 260—248 XR

HENRY R. JILES, Primary Examiner

U.S. Cl. X.R.

260—249.5, 249.8, 249.9, 247.2, 247.1; 71—93

PO-1050 PFe/mm
(5/69)

UNITED STATES PATENT OFFICE
CERTIFICATE OF CORRECTION

Patent No. 3,544,570              Dated December 30, 1970

Inventor(s) 1) Helmut Timmler 2) Richard Wegler 3) Ludwig Eue
4) Helmuth Hack

It is certified that error appears in the above-identified patent and that said Letters Patent are hereby corrected as shown below:

Col. 8, line 19

"sail" should be --soil--

Col. 8, table 1 last column

"4" should be --3--

Col. 12, table 4

Next to last column "43" should be --4
                                    3--

Col. 15, table 11 last figure in last column: "2706" should be --270-

Col. 16, Table 13 in last column:  "247" should be --240--

"140"    "      --147--

"202"    "      --208--

"189"    "      --187--

"215"    "      --219--

"278"    "      --275--

PO-1050
(5/69)

UNITED STATES PATENT OFFICE
CERTIFICATE OF CORRECTION

Patent No. 3,544,570          Dated December 30, 1970

Inventor(s) Helmut Timmler et al.          PAGE - 2

It is certified that error appears in the above-identified patent and that said Letters Patent are hereby corrected as shown below:

- 2 -

Col. 18, Claim 5

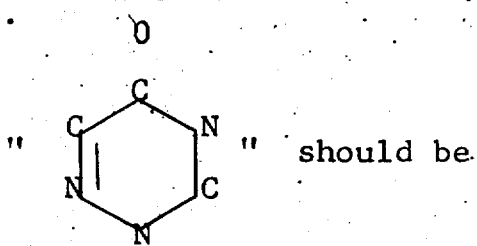 " should be 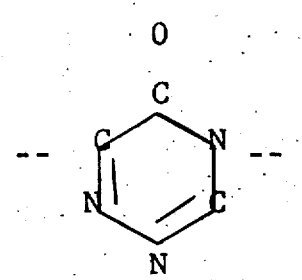

Signed and sealed this 1st day of June 1971.

(SEAL)
Attest:

EDWARD M. FLETCHER, JR.
Attesting Officer

WILLIAM E. SCHUYLER, JR.
Commissioner of Patents